US010145405B1

(12) United States Patent
Strom (10) Patent No.: US 10,145,405 B1
(45) Date of Patent: Dec. 4, 2018

(54) SELF-TAPPING INSERT WITH INTERIOR DIE SLOTS AND METHOD OF UTILIZING THE SAME TO REPAIR DAMAGED THREADS ON A FASTENER

(71) Applicant: Carl Strom, Topanga, CA (US)

(72) Inventor: Carl Strom, Topanga, CA (US)

(*) Notice: Subject to any disclaimer, the term of this patent is extended or adjusted under 35 U.S.C. 154(b) by 0 days.

(21) Appl. No.: 15/864,256

(22) Filed: Jan. 8, 2018

(51) Int. Cl.
*F16B 37/12* (2006.01)
*B23P 6/00* (2006.01)

(52) U.S. Cl.
CPC .............. *F16B 37/127* (2013.01); *B23P 6/00* (2013.01)

(58) Field of Classification Search
CPC .................................. B23P 6/00; F16B 37/127
USPC .................................. 470/187; 411/178, 188
See application file for complete search history.

(56) References Cited

U.S. PATENT DOCUMENTS

| | | | | |
|---|---|---|---|---|
| 1,459,240 A * | 6/1923 | Nonneman | ............... | B23G 5/08 408/104 |
| 2,567,480 A * | 9/1951 | Heldenbrand | ........... | B23G 5/00 408/215 |
| 2,922,455 A * | 1/1960 | Braendel | ............... | F16B 37/122 411/103 |
| 3,281,173 A * | 10/1966 | Rosan | ................... | F16B 37/122 403/242 |
| 3,956,787 A * | 5/1976 | Crumpacker | .......... | B23G 5/106 408/176 |
| 4,346,491 A * | 8/1982 | Kraus | ................... | B23G 9/009 470/185 |
| 4,730,968 A * | 3/1988 | Diperstein | ............ | F16B 37/122 411/178 |
| 4,872,790 A * | 10/1989 | Sibole | ...................... | B23G 5/04 408/221 |
| 4,971,497 A * | 11/1990 | Stoffer | .................... | F16B 37/04 411/108 |
| 2004/0136807 A1* | 7/2004 | Foerster, Jr. | ......... | F16B 37/127 411/178 |
| 2009/0110509 A1* | 4/2009 | Strom | ...................... | B23P 6/00 411/178 |
| 2009/0298600 A1* | 12/2009 | Emerson | ................ | B23G 9/009 470/187 |
| 2010/0329814 A1* | 12/2010 | Strom | ...................... | B23P 6/00 411/172 |

* cited by examiner

*Primary Examiner* — Gary W Estremsky
(74) *Attorney, Agent, or Firm* — James M. Duncan, Esq.; Klein DeNatale Goldner (57) ABSTRACT

A self-tapping insert has at least one interior die slot which repairs damaged threads on a fastener used with the insert. The self-tapping insert is used for providing replacing threads in a workpiece. The self-tapping insert has a cylindrical body with a top and a bottom, an exterior portion and an interior portion. The exterior portion has a cutting thread wrapped around the exterior surface, where the cutting thread sequentially intersects a cutting slot disposed in a generally axial orientation along the exterior portion. The interior portion has a screw thread for receiving the fastener. The screw thread intersects the die slot having a die slot leading edge and a die slot trailing edge. A screw thread leading edge is defined by each sequential intersection of the screw thread with the die slot leading edge and a screw thread trailing edge is defined by each sequential intersection of the screw thread with the die slot trailing edge.

15 Claims, 4 Drawing Sheets

SELF-TAPPING INSERT WITH INTERIOR DIE SLOTS AND METHOD OF UTILIZING THE SAME TO REPAIR DAMAGED THREADS ON A FASTENER

BACKGROUND OF THE INVENTION

The present invention generally relates to fasteners and threaded workpieces, and more particularly to affixing an internally threaded insert within a workpiece so that a threaded fastener may be made up to the workpiece utilizing the threads of the insert.

For a variety of reasons it is desirable to dispose a self-tapping sleeve within a workpiece. The self-tapping sleeve will typically have internal threads and will be utilized replacing the original threads in the workpiece. For example, if pre-existing threads of the workpiece are damaged, the damaged threads may be replaced with the threads of the insert. The inserts discussed herein are self-tapping, such that the insert may be driven into a bore of the workpiece cutting new threads in the bore as the insert is driven (i.e., the "bore threads"). The self-tapping inserts have external threads for making up into the bore threads and internal threads for receiving a fastener. The inventor herein is also the inventor of U.S. Pat. Nos. 7,819,613 and 8,439,617 which teach different embodiments of self-tapping inserts and methods for installing the inserts. The installation methods disclosed in the '613 and '617 patents are, to some degree, applicable to the installation of the presently disclosed invention and the '613 and '617 patents are specifically incorporated herein by this reference.

The most common use of self-tapping inserts is to provide replacement threads where the original threads of the workpiece have become damaged, and to stabilize the matrix material to prevent cracks from continuing or propagating. When the original threads become damaged, they can sometimes be repaired by chasing the damaged thread with a tap to restore the original thread shape. However, if the original thread shape cannot be restored by this measure, the thread must be replaced. One means of replacing the threads is to bore the hole to a larger diameter than the original thread diameter and to rethread the hole. However, a disadvantage of this procedure is that it requires a change in the fastener size from the original. If the equipment utilizes multiple fasteners of the original size, the different size fastener complicates maintenance and repair of the equipment because different tools are required, and correlating fasteners with the matching threads made more difficult. It is therefore desirable in some cases to be able to replace the original threads with threads of the same size so that the same size fastener may be utilized. In these cases, self-tapping inserts may be employed.

Self-tapping inserts are hardened steel cylinders, threaded on the exterior and, usually, in the interior. The interior thread diameter and pitch of the internal threads are those of the fastener to be installed.

The exterior of the self-tapping insert comprises a section which cuts new threads (the "cutting section") and a section of threads which make up into the newly cut threads. The cutting section of the known self-tapping inserts is tapered and usually comprises three or more slots or holes, which interrupt the tapered threads, thereby forming teeth similar to those of a conventional thread tap. Some type of driving mechanism is used to drive the self-tapping insertion into a pilot hole in the base metal of the workpiece. Various driving mechanisms may be utilized for this purpose, and may include drive bolts or other devices which engage or grip the self-tapping insert and allow sufficient rotational force to be applied to drive the self-tapping insert into the workpiece. The driving mechanism typically drives the self-tapping insert into a pilot hole in the base metal. This pilot hole is usually made by drilling out the damaged threads to form a bore hole in the base metal. As the insert is turned, the teeth of the cutting section engage and remove the base metal until the insert is fully installed and flush with the exterior surface of the workpiece. The insert remains in place within the workpiece by an interference fit between the newly cut threads in the workpiece and the exterior threads on the insert.

The known self-tapping inserts generally rely upon an interference fit between the newly cut threads and the external threads of the insert to prevent the insert from backing out of the base metal. The small metal chips generated by the cutting action of the insert assist the interference fit by wedging between the external threads of the insert and the new threads of the base metal. While this phenomenon is effective in preventing back-out of the insert from the base metal, it increases the torque requirements for installing the insert.

It is desirable that once the self-tapping insert is installed in the workpiece that it stays installed. In other words, it would be undesirable if the self-tapping insert were to unscrew from the workpiece as an internal fastener is either screwed into the insert or removed. One situation which can create such an undesired situation is where a fastener with damaged threads were installed into the insert. It is possible that defective/damaged threads will create so much friction (gall) as the bolt is rotated (in either installation or removal) that the insert will back out of the work piece.

For example, the self-tapping inserts of the inventor herein typically have exterior threads which are the reverse of the internal threads of the self-tapping insert, i.e., where the internal threads are a conventional right-hand thread, the cutting threads and exterior threads are typically left-hand threads. Ordinarily, this feature prevents the self-tapping insert from backing out when an internal fastener is removed. However, if a damaged internal fastener is utilized, there may be such friction generated that the self-tapping insert backs out as the fastener is installed. Thus, using a damaged fastener in a self-tapping insert can result in the unintended backing out of the insert from the workpiece.

There are other situations in which damaged fasteners have undesired results when utilized with self-tapping inserts. For example, in a number of applications for self-tapping inserts parts are secured to a workpiece by fasteners made up into the insert, where the parts are installed and removed often. Examples of such applications include molds in injection molding of plastics, dies in stamping presses, choks in steel mills, etc. While it is not a recommended practice to reuse fasteners, unfortunately it happens, particularly if the fasteners are an unusual size and/or are expensive. If a fastener is to be reused, a recommended procedure is for the operator to: (1) visually check the condition of the fastener; (2) visually check the condition of the threaded hole; (3) hand-install the fastener in the hole to double-check its condition and fit; and (4) use a torque wrench to accurately torque the fastener. However, in practice, this procedure is too frequently ignored. The operator is instructed to "get the product run going NOW." The situation is compounded if the operator installs the fastener with an impact wrench to save time. The result, either immediately or over time, is damage to the threaded holes.

Thus, a need exists for a self-tapping insert which can repair damaged threads of a fastener.

SUMMARY OF THE INVENTION

The present invention is directed to embodiments of a self-tapping insert which meets the needs identified above. The disclosed self-tapping insert is utilized to provide new threads within the smooth bore of a workpiece. In addition, the internal portion of the various embodiments of the self-tapping insert include structural features which chase the threads of fasteners being threaded into the internal threads of the self-tapping insert. These structural features repair damaged threads on a fastener as the fastener is installed. The inventor herein has given these structural features the name "die-slots", which is how these structural features shall henceforth be designated.

An embodiment of the disclosed self-tapping threaded insert has a cylindrical body having a top, a bottom, an exterior portion having an exterior surface, and an interior portion having an interior surface. The cylindrical body defines a central axis aligned from the top to the bottom. The exterior portion comprises a cutting thread wrapped around the exterior surface. The cutting thread sequentially intersects a cutting slot which is disposed in a generally axial orientation along the exterior portion. The cutting slot has a leading edge and a trailing edge. A cutting thread leading edge is defined by each sequential intersection of the cutting thread with the leading edge of the cutting slot. A cutting thread trailing edge is defined by each sequential intersection of the cutting thread with the trailing edge of the cutting slot. The exterior portion has an engagement thread which is wrapped around the exterior surface, where the engagement thread makes up into newly cut threads made by the cutting thread.

The interior portion of the self-tapping insert has a screw thread for receiving a threaded fastener. The screw thread wraps around the interior surface and sequentially intersects a die slot. The die slot has a die slot leading edge and a die slot trailing edge. A screw thread leading edge is defined by each sequential intersection of the screw thread with the die slot leading edge. A screw thread trailing edge is defined by each sequential intersection of the screw thread with the die slot trailing edge. The self-tapping insert has a driver interface for rotating the cylindrical body into a bore of a workpiece. Such driver interface may be an internal profile capable of receiving a portion of a tool. For example, the self-tapping insert may have a hexagonal internal profile for receiving a hexagonal driver. Alternatively, the interior of self-tapping insert may have slots which extend from the top of the insert, where a tool may engage the slots. These slots may also function as die slots.

The die slots may penetrate entirely through the wall of the insert. Alternatively, the die slots may terminate against the wall of the insert.

The screw thread may intersect the die slot a single time. Alternatively, the screw thread may intersect the die slot several times, such that as a threaded fastener is made up into the screw thread, a damaged portion of thread may be "chased" several times by the screw thread leading edge, where each time the screw thread leading edge cuts, cleans, and straightens the damaged portion of the thread. Thus, the die slot may have an axial length which extends across (i.e., "intersects") the screw thread several times. The inventor herein has found that a die slot which intersects the screw thread one to five times provides acceptable service. A self-tapping insert may have a single die slot or, as indicated in the drawings, may have multiple die slots. Large diameter self-tapping inserts may have up to 10 die slots.

A method of repairing a threaded fastener to be utilized with a self-tapping insert is also disclosed. In this method a threaded fastener having a damaged section of threads is inserted into the self-tapping insert. The self-tapping insert has an interior portion having an interior surface, where the interior portion has a screw thread for receiving the threaded fastener, where the screw thread wraps around an interior surface of the interior portion. The screw thread sequentially intersects a die slot, where the die slot has a die slot leading edge and a die slot trailing edge. A screw thread leading edge is defined by each sequential intersection of the screw thread with the die slot leading edge and a screw thread trailing edge is defined by each sequential intersection of the screw thread with the die slot trailing edge. The thread of the threaded fastener is engaged with the screw thread of the self-tapping insert. The threaded fastener is rotated until the damaged section passes completely through the die slot. The damaged section of the fastener is repaired and can be completely installed without risk of backing out the insert. If it is desirable to avoid introducing debris into the threads of the insert, the threaded fastener can also removed from the self-tapping insert and thereafter reinstalled.

These and other features, aspects, and advantages of the present invention will become better understood with regard to the following description, appended claims, and accompanying drawings.

DETAILED DESCRIPTION OF THE EMBODIMENTS

When the threads of a workpiece cannot be repaired by chasing the damaged thread with a tap to restore the original thread shape, replacement of the threads with a self-tapping insert provides an alternative method of repair. The pilot hole is usually made by drilling out the damaged threads to form a smooth walled bore hole in the base metal, and the insert is placed within the bore hole.

Figure 1:
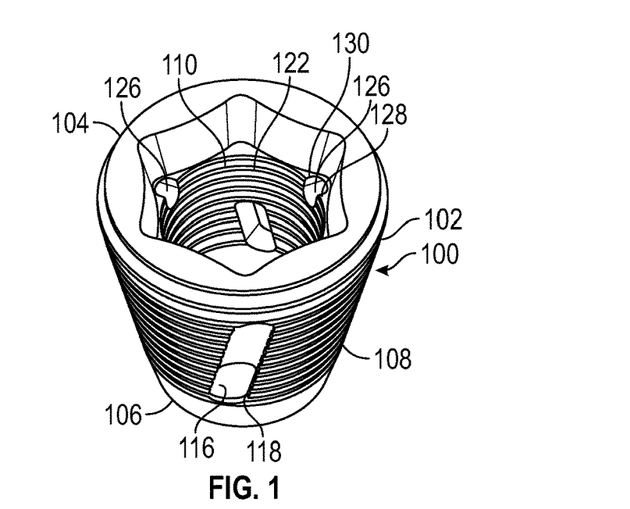
FIG. 1 is a perspective view of an embodiment of a self-tapping insert of the present invention having die-slots for thread repair.
Figure 2:
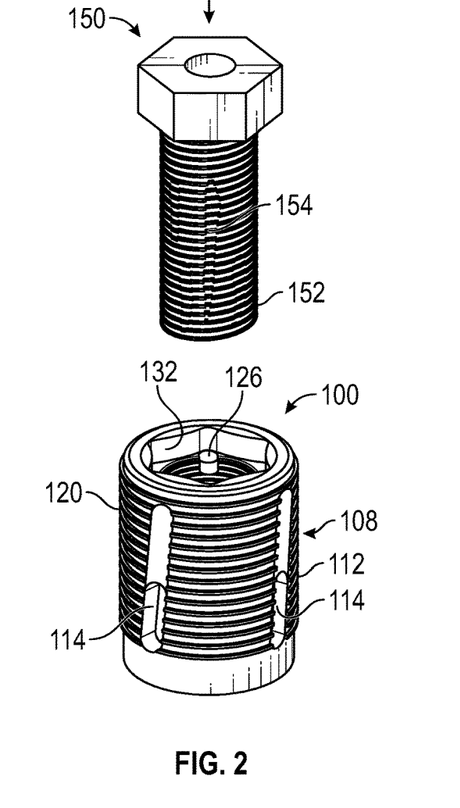
FIG. 2 depicts the self-tapping insert of FIG. 1 having a fastener with damaged threads being screwed into the self-tapping insert.
Figure 3:
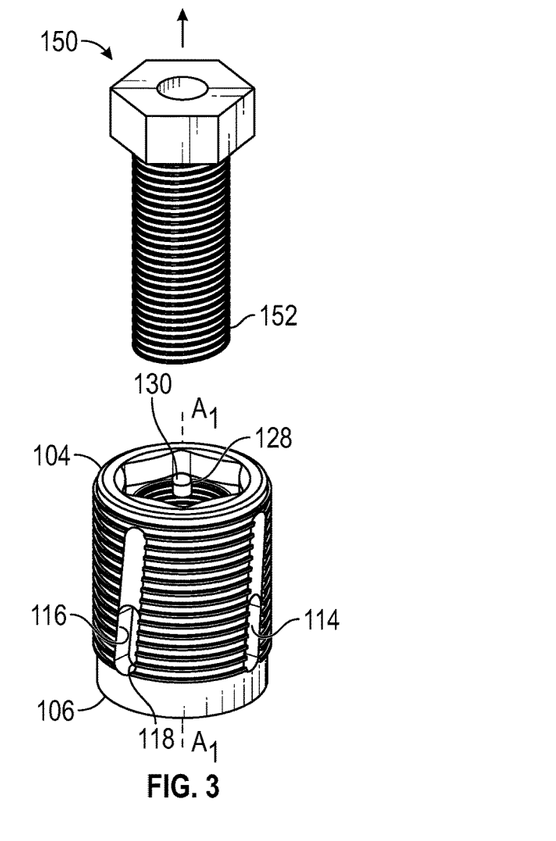
FIG. 3 depicts the self-tapping insert of FIG. 1 having a fastener with repaired threads withdrawn from the self-tapping insert.

A first embodiment of the disclosed self-tapping insert 100 is depicted in FIGS. 1-3. This embodiment comprises a cylindrical body 102, a top 104, a bottom 106, an exterior portion 108 having an exterior surface and an interior portion 110 having an interior surface. The cylindrical body 102 defines a central axis $A_1$ which is aligned from top 104 to bottom 106. Exterior portion 108 has a cutting thread 112 which helically wraps around the exterior surface of the lower part of exterior portion 108, where the cutting thread 112 intersects at least once a cutting slot 114 which is disposed in a generally axial orientation along the exterior portion. In other words, as cutting thread 112 wraps around the exterior surface of the lower part of exterior portion 108, it crosses cutting slot 114 on one or more wraps. Cutting slot 114 has a leading edge 116 and a trailing edge 118. Self-tapping insert 100 further comprises an engagement thread 120 above the cutting thread 112 where the engagement thread makes up into the threads made by the interaction of cutting thread 112 and cutting slot 114 as the self-tapping insert is rotated into a workpiece.

Cutting thread 112 and engagement thread 120 may be either right-handed or left-handed, but both cutting thread 112 and engagement thread 120 will be the same (i.e., right-handed or left-handed). However, if the internal threads of self-tapping insert 100 are right-handed threads, as typical, it is advantageous for cutting thread 112 and engagement thread 120 to be left-handed so as to prevent the insert 100 from backing out of the workpiece as a fastener is removed from the workpiece. For a self-tapping insert with left-handed cutting thread 112 and engagement thread 120, the self-tapping insert is installed into the workpiece by rotating the device counter-clockwise. As the self-tapping insert 100 is rotated, leading edge 116 will tap new threads as it progresses through the smooth bore. As the new threads are cut, metal chips or strips will be cut from the smooth bore, some of which will be gathered into the interior portion 110 of the cylindrical body 102 through cutting slots 114. The axis of the cutting slots 114 may be normal to the wall of the cylindrical body 102, such that the axis of the cutting slot coincides with a radius of the cylindrical body. Alternatively, to assist in directing metal chips to the interior portion 110, the axis of the cutting slots 114 may be offset from the radius by a small amount, such as fifteen degrees.

Interior portion 110 has a screw thread 122 which helically wraps around the interior surface of interior portion 110. As screw thread 122 wraps around the interior surface of interior portion 110, screw thread 122 intersects die slot 126, which is generally perpendicular to the screw thread, at least one time, and may intersect die slot 126 several times sequentially. Die slot 126 has a die slot leading edge 128 and a die slot trailing edge 130, where the die slot leading edge and die slot trailing edge are formed at the edges of the die slot where the screw thread intersects the die slot. A screw thread leading edge is defined by each intersection of the screw thread 122 with the die slot leading edge 128. Likewise, a screw thread trailing edge is defined by the sequential intersection of the screw thread 122 with die slot trailing edge 130. Thus, if the die slot 126 extends over three wraps of screw thread 122—which is approximately the case for the embodiment shown in FIG. 1—the die slot would have three screw thread leading edges and three screw thread trailing edges.

First embodiment of the disclosed self-tapping insert 100 also has a driver interface for rotating the cylindrical body 102 into a workpiece (not shown). For self-tapping insert 100, the driver interface is a hexagonal internal profile 132 in the interior surface of interior portion 110. Hexagonal internal profile 132 is adapted to receive a hexagonal male member, which may be rotated as necessary to install the self-tapping insert into the workpiece.

Once self-tapping insert 100 has been installed in a workpiece, a fastener 150 may be inserted into the insert. Fastener 150 has an external thread 152 which may have a damaged portion 154. As depicted in FIGS. 2-3, after the fastener 150 has been made up into self-tapping insert 100, the damaged portion 154 is repaired—in whole or in part— by the engagement of the damaged thread portion with die slot 126.

Self-tapping insert 100 may be fabricated from various materials having the requisite mechanical properties based upon the material of the workpiece. Suitable materials comprise steel and various alloy steels. The hardness of self-tapping insert 100 will be higher than the hardness of the material of the workpiece and also harder than the fastener 150.

Screw thread 122 will typically conform to the size and type of the damaged threads being replaced in the workpiece by the self-tapping insert. Screw thread 122 may generally be of all thread types, including USS, UNC, SAE, metric, standard pipe thread, metric pipe thread, British Special Pipe, Acme, etc.

Figure 4:
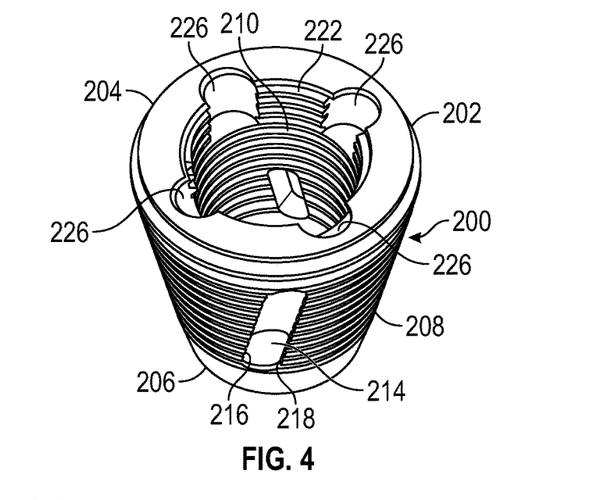
FIG. 4 is a perspective view of a second embodiment of a self-tapping insert of the present invention having die-slots for thread repair.
Figure 5:
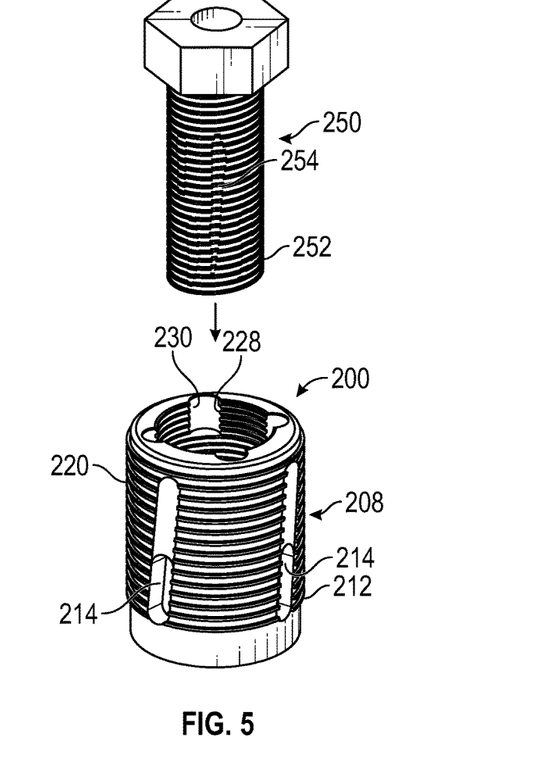
FIG. 5 depicts the self-tapping insert of FIG. 4 having a fastener with damaged threads being screwed into the self-tapping insert.
Figure 6:
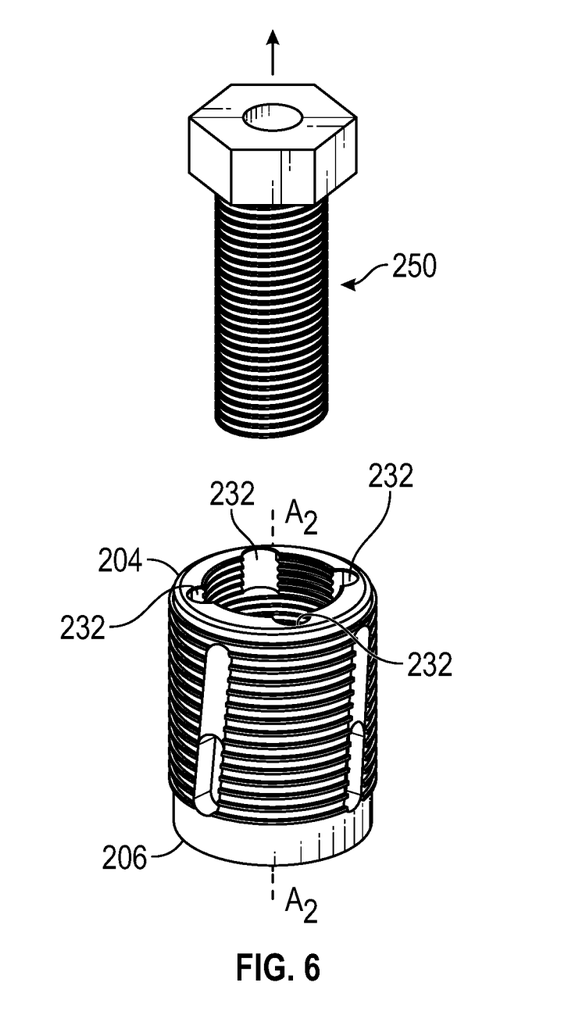
FIG. 6 depicts the self-tapping insert of FIG. 4 having a fastener with repaired threads withdrawn from the self-tapping insert.

A second embodiment of the disclosed self-tapping insert 200 is depicted in FIGS. 4-6. This embodiment comprises a cylindrical body 202, a top 204, a bottom 206, an exterior portion 208 having an exterior surface and an interior portion 210 having an interior surface. The cylindrical body 202 defines a central axis $A_2$ which is aligned from top 204 to bottom 206. Exterior portion 208 has a cutting thread 212 which helically wraps around the exterior surface of the lower part of exterior portion 208, where the cutting thread 212 intersects at least once a cutting slot 214 which is disposed in a generally axial orientation along the exterior portion. In other words, as cutting thread 212 wraps around the exterior surface of exterior portion 208, it crosses cutting slot 214 on one or more wraps. Cutting slot 214 has a leading edge 216 and a trailing edge 218. Self-tapping insert 200 further comprises an engagement thread 220 above cutting thread 212, wherein engagement thread 220 makes up into the threads made by the interaction of cutting thread 212 and cutting slot 214 as the self-tapping insert 200 is rotated into the workpiece.

Cutting thread 212 and engagement thread 220 may be either right-handed or left-handed, but both cutting thread 212 and engagement thread 220 will be the same. However, if the internal threads of self-tapping insert 200 are right-handed threads, as typical, it is advantageous for cutting thread 212 and engagement thread 220 to be left-handed so as to prevent the insert 200 from backing out of the workpiece as a fastener is removed from the workpiece. For a self-tapping insert with left-handed cutting thread 212 and engagement thread 220, the self-tapping insert is installed by rotating the device counter-clockwise into the workpiece. As the self-tapping insert 200 is rotated, leading edge 216 will tap new threads as it progresses through the smooth bore of the workpiece. As the new threads are cut, metal chips or strips will be cut from the smooth bore, some of which will be gathered into the interior portion 210 of the cylindrical body 202 through cutting slots 214. The axis of the cutting slots 214 may be normal to the wall of the cylindrical body 202, such that the axis of the cutting slot coincides with a radius of the cylindrical body. Alternatively, to assist in directing metal chips to the interior portion 210, the axis of the cutting slots 214 may be offset from the radius by a small amount, such as fifteen degrees.

Interior portion 210 has a screw thread 222 which helically wraps around the interior surface of interior portion 210. As screw thread 222 wraps around the interior surface of interior portion 210, screw thread 222 intersects die slot 226, which is generally perpendicular to the screw thread. Die slot 226 has a die slot leading edge 228 and a die slot trailing edge 230, where the die slot leading edge and die slot trailing edge are formed at the edges of the die slot where the screw thread intersects the die slot 226. A screw thread leading edge is defined by each intersection of the screw thread 222 with the die slot leading edge 228. Likewise, a screw thread trailing edge is defined by the sequential intersection of the screw thread 222 with die slot trailing edge 230. Thus, if the die slot 226 extends over four to five wraps of screw thread 222—which is approximately the case for the embodiment shown in FIG. 4—the die slot would have four to five screw thread leading edges and four to five screw thread trailing edges.

Figure 4A:
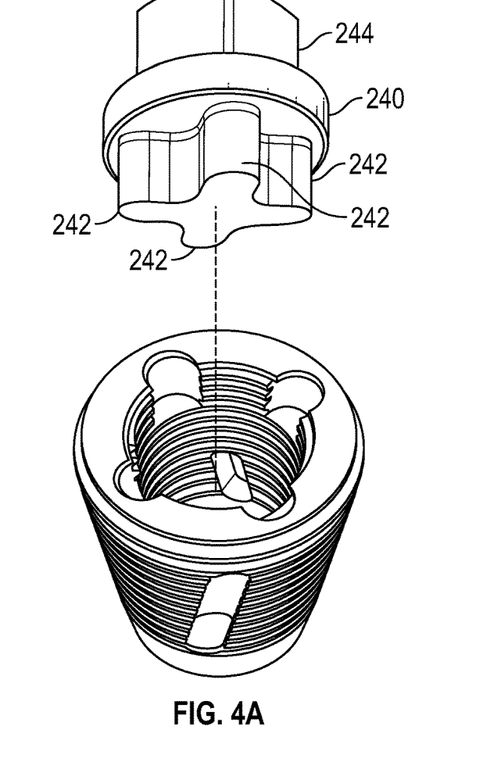
FIG. 4A shows a drive device which may be utilized with the self-tapping insert of FIG. 4.

Second embodiment of the disclosed self-tapping insert 200 also has a driver interface for rotating the cylindrical body 202 into a workpiece (not shown). For self-tapping insert 200, the driver interface is the internal profile at the top 204 of the self-tapping insert comprising four lobe-shaped openings 232. An engagement head 240 shown in FIG. 4A engages lobe shaped-openings 232 with lobes 242. Engagement head 240 comprises a tool engagement interface structure 244 which a tool may engage.

Once self-tapping insert 200 has been installed in a workpiece, a fastener 250 may be inserted into the insert. Fastener 250 has an external thread 252 which may have a damaged portion 254. As depicted in FIGS. 5-6, after the fastener 250 has been made up into self-tapping insert 200, the damaged portion 254 is repaired—in whole or in part—by the engagement of the damaged thread portion with die slot 226.

Self-tapping insert 200 may be fabricated from various materials having the requisite mechanical properties based upon the material of the workpiece. Suitable materials comprise steel and various alloy steels. The hardness of self-tapping insert 200 will be higher than the hardness of the material of the workpiece and the hardness of the fastener 250.

Screw thread 222 will typically conform to the size and type of the damaged threads being replaced in the workpiece by the self-tapping insert. Screw thread 222 may generally be of all thread types, including USS, UNC, SAE, metric, standard pipe thread, metric pipe thread, British Special Pipe. Acme, etc.

Figure 7:
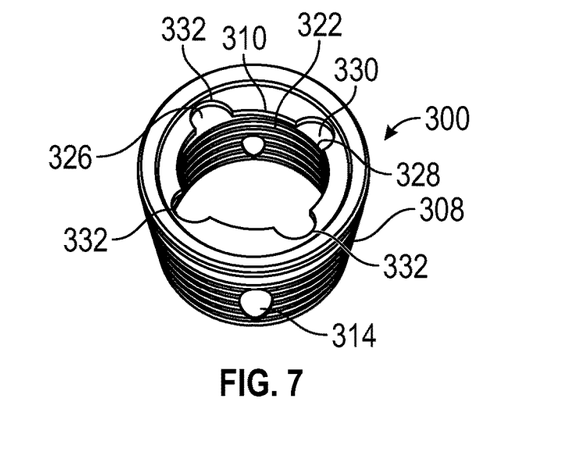
FIG. 7 is a perspective view of a third embodiment of a self-tapping insert of the present invention having die-slots for thread repair.
Figure 8:
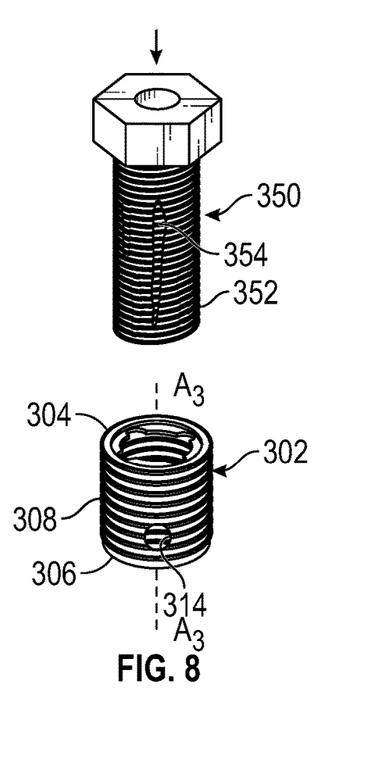
FIG. 8 depicts the self-tapping insert of FIG. 7 having a fastener with damaged threads being screwed into the self-tapping insert.
Figure 9:
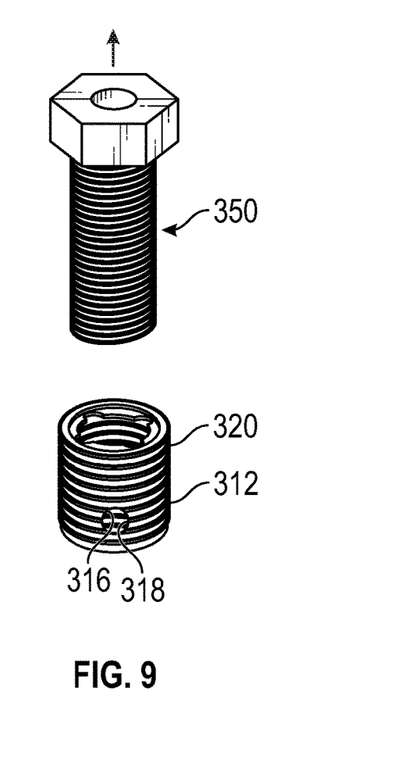
FIG. 9 depicts the self-tapping insert of FIG. 7 having a fastener with repaired threads withdrawn from the self-tapping insert.

A third embodiment of the disclosed self-tapping insert 300 is depicted in FIGS. 7-9. This embodiment comprises a cylindrical body 302, a top 304, a bottom 306, an exterior portion 308 has an exterior surface and an interior portion 310 has an interior surface. The cylindrical body 302 defines a central axis $A_3$ which is aligned from top 304 to bottom 306. Exterior portion 308 has a cutting thread 312 which helically wraps around the exterior surface of the lower part of exterior portion 308, where the cutting thread 312 intersects a cutting slot 314 which is disposed in a generally axial orientation along the exterior portion. In other words, as cutting thread 312 wraps around the exterior surface of exterior portion 308, it crosses cutting slot 314 on each wrap. Cutting slot 314 has a leading edge 316 and a trailing edge 318. Self-tapping insert 300 further comprises an engagement thread 320 which is above cutting thread 312 and which makes up into the threads made by the interaction of cutting thread 312 and cutting slot 314.

Cutting thread 312 and engagement thread 320 may be either right-handed or left-handed, but both cutting thread 312 and engagement thread 320 will be the same (i.e., either right-handed or left-handed). However, if the internal threads of self-tapping insert 300 are right-handed threads, as typical, it is advantageous for cutting thread 312 and engagement thread 320 to be left-handed so as to prevent the insert 300 from backing out of the workpiece as a fastener is removed from the workpiece. For a self-tapping insert with left-handed cutting thread 312 and engagement thread 320, the self-tapping insert is installed by rotating the device counter-clockwise into the workpiece. As the self-tapping insert 300 is rotated, leading edge 316 will tap new threads as it progresses through the smooth bore of the workpiece. As the new threads are cut, metal chips or strips will be cut from the smooth bore, some of which will be gathered into the interior portion 310 of the cylindrical body 302 through cutting slots 314. The axis of the cutting slots 314 may be normal to the wall of the cylindrical body 302, such that the axis of the cutting slot coincides with a radius of the cylindrical body. Alternatively, to assist in directing metal chips to the interior portion 310, the axis of the cutting slots 314 may be offset from the radius by a small amount, such as fifteen degrees.

Interior portion 310 has a screw thread 322 which helically wraps around the interior surface of interior portion 310. As screw thread 322 wraps around the interior surface of interior portion 310, screw thread 322 intersects die slot 326 at least once. Die slot 326 is generally perpendicular to the screw thread 322. Die slot 326 has a die slot leading edge 328 and a die slot trailing edge 330, where the die slot leading edge and die slot trailing edge are formed at the edges of the die slot where the screw thread 322 intersects the die slot 326. A screw thread leading edge is defined by each intersection of the screw thread 322 with the die slot leading edge 328. Likewise, a screw thread trailing edge is defined by the intersection of the screw thread 322 with die slot trailing edge 330. Thus, if the die slot 326 extends over approximately three wraps of screw thread 322—which is approximately the case for the embodiment shown in FIG. 7—the die slot would have three screw thread leading edges and three screw thread trailing edges.

Third embodiment of the disclosed self-tapping insert 300 also has a driver interface for rotating the cylindrical body 302 into a workpiece (not shown). For self-tapping insert 300, the driver interface is the internal profile at the top 304 of the self-tapping insert comprising four lobe-shaped openings 332. An engagement head similar to that shown in FIG. 4A engages lobe shaped-openings 332.

Once self-tapping insert 300 has been installed in a workpiece, a fastener 350 may be inserted into the insert. Fastener 350 has an external thread 352 which may have a damaged portion 354. As depicted in FIGS. 5-6, after the fastener 350 has been made up into self-tapping insert 300, the damaged portion 354 is repaired—in whole or in part—by the engagement of the damaged thread portion with die slot 326.

Self-tapping insert 300 may be fabricated from various materials having the requisite mechanical properties based upon the material of the workpiece. Suitable materials comprise steel and various alloy steels. The hardness of self-tapping insert 300 will be higher than the hardness of the material of the workpiece and higher than the hardness of fastener 350.

Screw thread 322 will typically conform to the size and type of the damaged threads being replaced in the workpiece by the self-tapping insert. Screw thread 322 may generally be of all thread types, including USS, UNC, SAE, metric, standard pipe thread, metric pipe thread. British Special Pipe. Acme, etc.

These and other features, aspects, and advantages of the present invention will become better understood with regard to the following description, appended claims, and accompanying drawings. While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A self-tapping insert for providing replacement threads in a bore of a workpiece, the self-tapping insert comprising:
   a cylindrical body having a top, a bottom, an exterior portion having an exterior surface and an interior portion having an interior surface, the cylindrical body defining a central axis aligned from the top to the bottom;
   the exterior portion comprising a cutting thread wrapped around the exterior surface, the cutting thread intersecting a cutting slot disposed in a generally axial orientation along the exterior portion, the cutting slot having a leading edge and a trailing edge, wherein a cutting thread leading edge is defined by each intersection of the cutting thread with the leading edge of the cutting slot and a cutting thread trailing edge is defined by each intersection of the cutting thread with the trailing edge of the cutting slot, the exterior portion further comprising an engagement thread wrapped around the exterior surface, the engagement thread disposed between the cutting thread and the top of the cylindrical body;
   the interior portion comprising a screw thread for receiving a threaded fastener, the screw thread wrapped around the interior surface, the screw thread intersecting a die slot wherein the die slot extends from the top, the die slot comprising a die slot leading edge and a die slot trailing edge, wherein a screw thread leading edge is defined by each intersection of the screw thread with the die slot leading edge and a screw thread trailing edge is defined by each intersection of the screw thread with the die slot trailing edge; and
   a driver interface for rotating the cylindrical body into a bore of a workpiece.

2. The self-tapping insert of claim 1 wherein the cutting thread and the engagement thread are left-handed threads.

3. The self-tapping insert of claim 1 wherein the interior portion comprises a hexagonal profile as the driver interface.

4. The self-tapping insert of claim 1 comprising two to ten die slots.

5. The self-tapping insert of claim 4 wherein the slots also function as the driver interface.

6. The self-tapping insert of claim 1 wherein the die slot does not penetrate through to the exterior surface.

7. The self-tapping insert of claim 1 wherein the die slot intersects the screw thread one to five times.

8. The self-tapping insert of claim 1 wherein die slot extends from the top of the self-tapping insert.

9. The self-tapping insert of claim 8 comprising two to ten die slots.

10. The self-tapping insert of claim 9 wherein the slots also function as the driver interface.

11. The self-tapping insert of claim 1 wherein the die slot intersects the screw thread one to five times.

12. A method of repairing a threaded fastener to be utilized with a self-tapping insert, wherein the threaded fastener has a damaged section of a thread, the method comprising the steps of:
   inserting the threaded fastener into the self-tapping insert, wherein the self-tapping insert comprises a cylindrical body having a top, a bottom, an exterior portion having an exterior surface and an interior portion having an interior surface, the interior portion comprising a screw thread for receiving the threaded fastener, the screw thread wrapped around an interior surface of the interior portion, the screw thread intersecting a die slot wherein the die slot extends from the top, the die slot comprising a die slot leading edge and a die slot trailing edge, wherein a screw thread leading edge is defined by each intersection of the screw thread with the die slot leading edge and a screw thread trailing edge is defined by each intersection of the screw thread with the die slot trailing edge;
   engaging the thread of the threaded fastener with the screw thread of the self-tapping insert;
   rotating the threaded fastener until the damaged section passes completely through the die slot;
   completing installation of the fastener into the self-tapping insert.

13. A self-tapping insert for providing replacement threads in a bore of a workpiece, the self-tapping insert comprising:
   a cylindrical body having a top, a bottom, an exterior portion having an exterior surface and an interior portion having an interior surface, the cylindrical body defining a central axis aligned from the top to the bottom;
   the exterior portion comprising a cutting thread wrapped around the exterior surface, the cutting thread intersecting a cutting slot disposed in a generally axial orientation along the exterior portion, the cutting slot having a leading edge and a trailing edge, wherein a cutting thread leading edge is defined by each intersection of the cutting thread with the leading edge of the cutting slot and a cutting thread trailing edge is defined by each intersection of the cutting thread with the trailing edge of the cutting slot, the exterior portion further comprising an engagement thread wrapped around the exterior surface, the engagement thread disposed between the cutting thread and the top of the cylindrical body;
   the interior portion comprising a screw thread for receiving a threaded fastener, the screw thread wrapped around the interior surface, the screw thread intersecting a die slot, wherein the die slot does not penetrate through to the exterior surface, the die slot comprising a die slot leading edge and a die slot trailing edge, wherein a screw thread leading edge is defined by each intersection of the screw thread with the die slot leading edge and a screw thread trailing edge is defined by each intersection of the screw thread with the die slot trailing edge; and a driver interface for rotating the cylindrical body into a bore of a workpiece.

14. The self-tapping insert of claim 13 wherein the cutting thread and the engagement thread are left-handed threads.

15. The self-tapping insert of claim 13 wherein the interior portion comprises a hexagonal profile as the driver interface.

\* \* \* \* \*